(12) United States Patent
Belling et al.

(10) Patent No.: US 11,787,427 B2
(45) Date of Patent: Oct. 17, 2023

(54) METHOD AND DEVICE FOR CONTROLLING AT LEAST ONE ACTUATOR OF AN ACTUATOR SYSTEM

(71) Applicant: Knorr-Bremse Systeme Fuer Nutzfahrzeuge GmbH, Munich (DE)

(72) Inventors: Michael Belling, Renningen (DE); Christian Kaufmann, Sindelfingen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 264 days.

(21) Appl. No.: 17/593,962

(22) PCT Filed: Feb. 28, 2020

(86) PCT No.: PCT/EP2020/055327
§ 371 (c)(1),
(2) Date: Sep. 29, 2021

(87) PCT Pub. No.: WO2020/200599
PCT Pub. Date: Oct. 8, 2020

(65) Prior Publication Data
US 2022/0161809 A1  May 26, 2022

(30) Foreign Application Priority Data

Apr. 1, 2019 (DE) ............. 10 2019 108 412.1

(51) Int. Cl.
*B60W 50/029* (2012.01)
*B60R 16/023* (2006.01)

(52) U.S. Cl.
CPC ....... *B60W 50/029* (2013.01); *B60R 16/0231* (2013.01)

(58) Field of Classification Search
CPC .................. B60W 50/029; B60R 16/0231
(Continued)

(56) References Cited

U.S. PATENT DOCUMENTS 6,345,225 B1   2/2002  Bohm et al.
2014/0277979 A1*  9/2014  Boran ............... B60T 8/885
                                                        701/1
(Continued)

FOREIGN PATENT DOCUMENTS

CN     103318040 A    9/2013
CN     103612562 A    3/2014
(Continued)

OTHER PUBLICATIONS

International Search Report for PCT/EP2020/055327 dated Jun. 9, 2020.

*Primary Examiner* — Alfonso Perez Borroto
(74) *Attorney, Agent, or Firm* — NORTON ROSE FULBRIGHT US LLP; Gerard Messina

(57) ABSTRACT

A method for controlling at least one actuator of an actuator system, including: outputting a first control signal from a first control device via a line to an actuator, wherein the actuator system has at least the first control device and a second control device, wherein the first control device is configured to control at least the actuator via the line and wherein the second control device is configured to control the actuator via the line; detecting the first control signal on the line by the second control device and suppressing the output of a second control signal to the actuator by the second control device during a time in which the first control device is outputting the first control signal to the line; determining a time by the second control device at which no first control signal is present on the line; and applying to the actuator a second control signal via the line by the second (Continued)

control device if no first control signal is present on the line. Also described are a related apparatus and a computer readable medium.

12 Claims, 2 Drawing Sheets

(58) Field of Classification Search
USPC .......................................................... 307/9.1
See application file for complete search history.

(56) References Cited

U.S. PATENT DOCUMENTS

2017/0334437 A1* 11/2017 Mikami ................ B60W 20/50
2018/0105183 A1*  4/2018 Kollmer .............. G06F 11/0739
2018/0281597 A1* 10/2018 Herb .................... B60L 3/0084
2020/0164893 A1   5/2020 Orlov et al.

FOREIGN PATENT DOCUMENTS

| CN | 104765018 A | 7/2015 |
| CN | 107420613 A | 12/2017 |
| DE | 10 2017 218 395 A1 | 4/2018 |

* cited by examiner

METHOD AND DEVICE FOR CONTROLLING AT LEAST ONE ACTUATOR OF AN ACTUATOR SYSTEM

FIELD OF THE INVENTION

The approach presented here relates to a method and a device for controlling at least one actuator of an actuator system as described in the main description herein.

BACKGROUND INFORMATION

In the course of automated or autonomous driving of vehicles of all kinds, it is often helpful to create redundancies. These redundancies should be configured in such a way that the vehicle cannot enter a safety-critical or uncontrollable condition. This means that there is a move to place systems such as EBS or ABS at multiple points in the vehicle. Another option is to supplement a system with similar subsystems that can reproduce the functionality. In the event of a fault, the faulty system is switched off and the second fault-free system then undertakes the task and thus creates redundancy.

In order to be able to represent an electric brake system in commercial vehicles redundantly, the number of pressure control valves on each axle or on the respective wheel would thus double. However, multiple systems, such as twice the number of pressure control valves, are expensive and cannot be integrated into the vehicle due to the limited installation space and complex wiring.

SUMMARY OF THE INVENTION

Against this background, with the approach presented here, a method, further a device which uses this method, and finally a corresponding computer program according to the main description herein are presented. Due to the measures mentioned in the further descriptions herein, advantageous further developments and improvements of the device specified in the main description are possible.

A method for controlling at least one actuator of an actuator system is presented, wherein the actuator system has at least a first and a second control device, wherein the first control device is configured to control the actuator via a line and wherein the second control device is configured to control the actuator via the line. The method consists of the following steps:

Outputting a first control signal from the first control unit via the line to the actuator;

Detecting the first control signal on the line by the second control device and suppressing an output of a second control signal to the actuator by the second control device during the time in which the first control device is outputting the first control signal to the line;

Determination of a time by the second control device at which there is no first control signal on the line; and Applying a second control signal to the actuator via the line with the second control device if there is no first control signal on the line.

A control signal can also be formed as a so-called test pulse to diagnose the condition of the actuator, but not to trigger any action. In the case of a solenoid valve, for example, this control signal is short in time in order to detect an inductance due to the configuration of the solenoid valve, but not to operate the armature or to introduce a pressure.

A control device can be understood in the present case to be corresponding unit which outputs an electrical signal as a control signal to the actuator. An actuator can be understood, for example, to be an element which performs a mechanical movement in response to the control signal. For example, the actuator may be a pneumatic element or a hydraulic element such as a pneumatic pressure valve of a brake system of a vehicle. The control signal can be transmitted to the actuator via a line. A line, for example, can be understood to be a bus line or a line for the exclusive transmission of the control signal.

The approach proposed here is based on the realization that the actuator of the actuator system can be controlled safely and efficiently if it is ensured that a control signal for controlling the actuator is only output from one control device to the actuator, even if for redundancy reasons multiple control devices are provided which can control the actuator in principle. Only one control device at a time should be entitled to control (this happens at the functional level). However, both control devices should diagnose a fault within a few milliseconds during runtime, so that in the event of redundancy, an intervention does not occur without effect (undetected fault). For this purpose, for example, the second control device is thus configured so that it can monitor signal states on the line to the actuator and can thereby recognize that the first control signal is present which is output from the first control device via the line to the actuator. In this case, the output of the second control signal on the line by the second control device can be suppressed. However, in order to still enable the actuator to also be controlled via the line from the second control device, the second control device may still be configured to determine a time at which there is no first control signal on the line and then in response the second control device will apply the second control signal to the actuator via the line. In this way, it can be advantageously ensured that the actuator does not receive two control signals at the same time and thus the function of the actuator can be ensured robustly and reliably. Also by such control of the actuator by the first or second control signal it is ensured that the first control device or the second control device can reliably check a signal transmission to the actuator or a reaction of the actuator to the control signal in question and thereby a diagnostic capability of the first control device as well as the second control device can be optimized.

As a result, it can be advantageously enabled that multiple electronic control devices, for example for brake control, can easily use or control a common pressure control valve. However, the problem with this dual use of a pressure control valve is the synchronization of the two electronic control devices with regard to their diagnostic capability. In addition, simultaneous control of the actuators or the actuator can be avoided. An objective of the approach presented here can therefore be seen in the fact that a method for the communication and/or synchronization of multiple electronic control devices via shared actuators or at least one shared actuator can be made possible.

An embodiment of the approach proposed here is advantageous in which in the determination step the time is determined as a predetermined period of time after reception of the first control signal in the second control device and/or wherein in the determination step the time is determined by the reception of a predetermined sequence in the first control signal. Such an embodiment of the approach proposed here offers the advantage of reliable determination of the time, so that a simple protocol for the use of the line to the actuator can be realized with a technically simple arrangement.

According to a further embodiment of the approach proposed here, an evaluation step is provided in which a response signal of the actuator obtained to the first and/or second control signal is evaluated in the first and/or second control device in order to check a functionality of the actuator and/or of the first and/or second control device. In particular, a function of a high-side switch and/or low-side switch in the first and/or second control unit or in the actuator can be monitored in the evaluation step. Such an embodiment of the approach proposed here offers the advantage of being able to check in the first control device and/or the second control device the control of the actuator or the functionality of the actuator in order to be able to obtain a diagnosis of the condition or functionality of the actuator system.

Also, according to a further embodiment of the approach proposed here, in the application step the actuator can be supplied with the second control signal, which differs from the first control signal. Such an embodiment offers the advantage of being able to check different functions of the actuator with the individual control signals or being able to very easily detect in the individual control units the control of the actuator by the respective other control unit.

Furthermore, an embodiment of the approach proposed here is conceivable, in which in a control step the actuator is controlled by the first control device in a normal operating mode and the actuator is controlled by the second control device in a fault operating mode in which a fault in the operation of the first control unit or in a connection of the first control unit to the actuator has been detected. Such an embodiment of the approach proposed here offers the advantage of a clear distribution of roles of the first control device as the main control device in the fault-free case and the second control device as a redundant control device in the event of the occurrence of a fault. In this way, it can be avoided that errors may occur due to an ambiguous assignment of the authority to issue instructions for controlling the actuator.

An embodiment of the approach proposed here can be realized technically particularly simply, in which the first control signal is transmitted via a bus line to the actuator in the output step and/or the second control signal is transmitted via the bus line to the actuator in the application step, in particular wherein the bus line is in the form of a CAN bus line, a LIN bus line, a MOST bus line or a pure Ethernet bus line. Alternatively, the first control signal can be transmitted to the actuator via a line reserved exclusively for the first and/or second control signal in the output step and/or the second control signal can be transmitted to the actuator via the line reserved exclusively for the first and/or second control signal in the application step. As a result, this embodiment can advantageously fall back on already mature concepts for redundant signal transmission, whereby the robustness of the actuator system can be increased and the error-proneness of the control of the actuator system can be reduced.

Also of advantage is an embodiment of the approach proposed here in which the steps of the method are carried out repeatedly, wherein in a repeatedly performed output step a check is carried out as to whether the second control signal is present on the line to the actuator and wherein the first control signal is not output if the second control signal is present on the line and/or wherein if the second control signal is not present the first control signal is output to the actuator. Such an embodiment advantageously ensures that the first control device also does not output a (further) first control signal on the line to the actuator if a second control signal from the second control device is still present on this line. This also optimizes the robustness and freedom from interference of the control of actuator system.

An embodiment of the approach proposed here is particularly advantageous in which the first control signal is output to a pressure valve of a vehicle as an actuator in the output step and/or the second control signal is applied to a pressure valve of a vehicle as an actuator in the application step. As a result, safety-critical control scenarios can be avoided, especially in vehicle systems.

According to a further embodiment of the approach presented here, the actuator system comprises at least a second actuator, which is connected to the first and the second control devices via a second line. Furthermore, in the output step, a third control signal is output from the first control unit via a second line to the second actuator, wherein in the detection step the third control signal on the second line is detected by the second control device and an output of a fourth control signal to the second actuator is suppressed by the second control device during the time in which the first control unit is outputting the third control signal to the second line. In the determination step, a second time is determined by the second control device at which there is no third control signal on the second line and in the application step the second actuator is supplied with the fourth control signal via the second line by the second control device if no third control signal is present on the second line. Such an embodiment of the approach presented here offers the advantage that not only can the control of a (first) actuator be advantageously configured, but that the concept presented here can also be used for the control of more than one actuator by at least two control devices. In this way, the approach presented here can be used even more generally, since, for example, only two control devices can be used for the redundant control of multiple actuators. The approach presented here can also be used for more than two control devices, wherein the corresponding monitoring of the signal states on the lines can easily be derived from the matters described above by the person skilled in the art.

These methods can be implemented, for example, in software or in hardware or in a mixed form of software and hardware, for example in a control device.

The approach presented here also creates a device which is configured to carry out, control or implement the steps of a variant of a method presented here in appropriate devices. The object underlying the invention can also be achieved quickly and efficiently by this embodiment of the invention in the form of a device.

For this purpose, the device may have at least one computing unit for processing signals or data, at least one memory unit for storing signals or data, at least one interface to a sensor or an actuator for reading sensor signals from the sensor or for outputting data or control signals to the actuator and/or at least one communication interface for reading or outputting data embedded in a communication protocol. The computing unit may be, for example, a signal processor, a microcontroller or the like, wherein the memory unit may be a flash memory, an EEPROM or a magnetic memory unit. The communication interface may be configured to read or output data wirelessly and/or wired, wherein a communication interface which can read in or output wired data, for example, can read this data electrically or optically from a corresponding data transmission line or can output it to a corresponding data transmission line.

A device can be understood in the present case to be an electrical device which processes sensor signals and outputs control and/or data signals depending thereon. The device may have an interface which may be in hardware and/or software. In a hardware form, the interfaces can, for example, be part of a so-called system ASIC, which includes various functions of the device. However, it is also possible that the interfaces are dedicated integrated circuits or at least partly consist of discrete components. In the case of a software form, the interfaces can be software modules which are present, for example, on a microcontroller in addition to other software modules.

Also advantageous is a computer program product or computer program with program code which may be stored on a machine-readable carrier or a memory medium such as a semiconductor memory, a hard disk memory or an optical memory and which is used to carry out, implement and/or control the steps of the method according to one of the embodiments described above, in particular if the program product or program is executed on a computer or a device.

Favorable exemplary embodiments of the present approach are explained in more detail below with reference to the attached figures.

DETAILED DESCRIPTION

Figure 1:
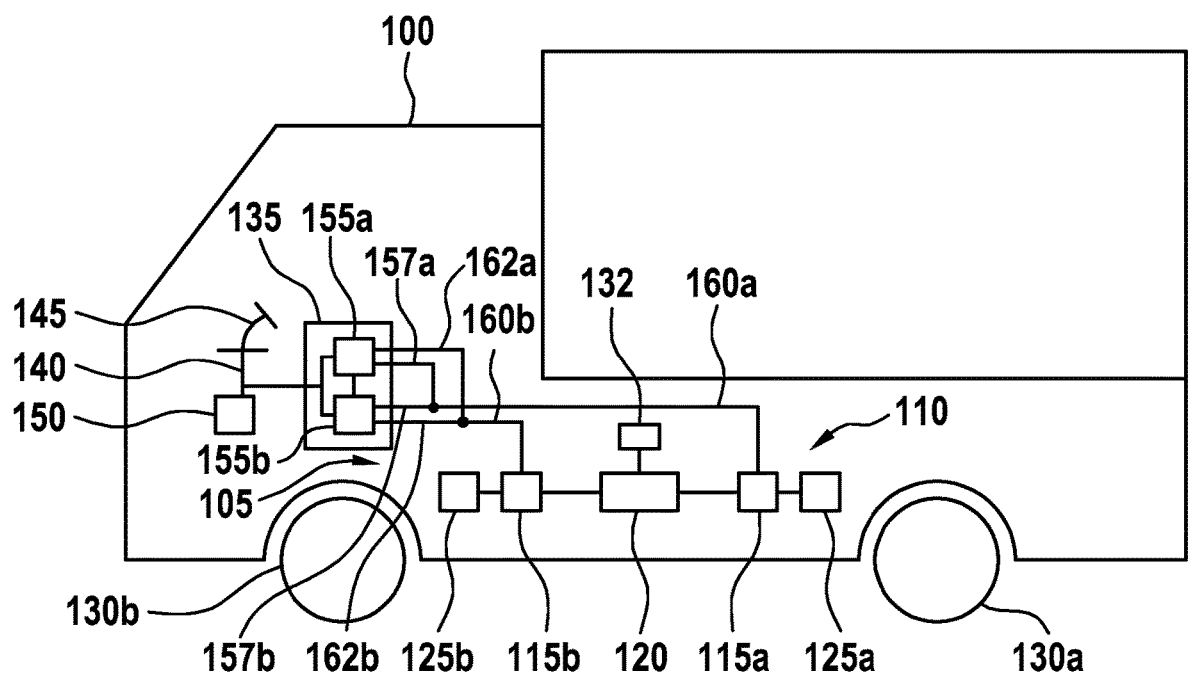
FIG. 1 shows a schematic representation of a vehicle with an actuator system in which an embodiment of the approach presented here is implemented.

FIG. 1 shows a schematic representation of a vehicle 100 with an actuator system 105. The vehicle 100 may be configured, for example, as a commercial vehicle or truck to transport goods and/or persons by road. Alternatively, however, the vehicle may also be a passenger car, a bus, a work tool such as a tractor or a lifting platform or the like. The actuator system 105 may be a brake system 110, for example. For this purpose, actuators 115a or 115b may be provided, which are each configured, for example, as a pneumatic pressure regulating valve or a pressure control valve and pass compressed air from a storage tank 120 to brake units 125a or 125b, for example in order to brake wheels 130a and 130b of the vehicle 100. The storage tank 120 is refilled with compressed air after the compressed air delivery by an air compressor or a compressor 132. In order to activate the brake units 125a and 125b by the actuators 115a and 115b, a control unit 135 is now provided, in which a brake request signal 140 is read in when a driver of the vehicle 100 presses a brake pedal 145, for example. Alternatively, the brake request signal 140 can be output by a brake control unit 150, which is, for example, part of an autonomous vehicle guidance system if the vehicle 100 can drive autonomously. In order to ensure that the brake request signal 140 also actually activates the brake units 125a or 125b in a responsive manner, a first control device 155a and a second control device 155b are provided in the control unit 135, which, for example, can be implemented identically and both of which are, for example, supplied in parallel with the brake request signal 140. Each of the control devices 155a and 155b can independently control the first actuator 115a, i.e. the first pressure regulating valve, or the second actuator 115b, i.e. the second pressure regulating valve, in order to activate the brake units 125a or 125b. In this way it can be ensured that even if one of the control devices 155a or 155b fails, it is still possible to control the actuators 115a or 115b. However, it is also conceivable that one of the control devices 155a or 155b does not control both actuators 115a or 115b, but only one of the actuators 115a or 115b, depending on how much braking is to be applied or which brake or brake unit 125a or 125b is to be activated or how strongly it is to be activated.

In order to ensure the reliable control capability of both the first control device 155a and the second control device 155b for the first actuator 115a or the second actuator 115b, it should be checked in a test cycle, for example when commissioning the vehicle 100, whether the control of the first actuator 115a is possible both from the first control device 155a and from the second control device 155b. Similarly, it should also be ensured that the control of the second actuator 115b is possible both from the first control device 155a and from the second control device 155b. For this purpose, the actuators 115 can be controlled by corresponding control signals 157 as test signals and, for example, a reaction of the actuators 115 to the corresponding control signals 157 can be evaluated in the first control device 155a or the second control device 155b.

In order to still ensure that both control devices 155, i.e. the first control device 155a by a first control signal 157a and the second control device 155b by a second control signal 157b, do not simultaneously control the (first) actuator 115a via a (first) line 160a and/or the first control device 155a by a third control signal 162a and the second control device 155b by a fourth control signal 162b do not simultaneously control the second actuator 115b via a second line 160b, suitable monitoring of the communications or the occupancy of the (first) line 160a and/or the second line 160b with corresponding control signals is required.

Such monitoring of the communications or the occupancy of the line 160a and/or the second line 160b can be carried out by, for example, the first control device 155a outputting the first control signal 157a to the line 160a. The second control device 155b may be configured to detect the first control signal 157a on the line 160a and in this case to suppress the output of the second control signal 157a on the line 160a. Subsequently, a time may be determined in the second control device 155b at which there is no longer a first control signal 157a on the line 160a. This time can be determined, for example, by expiry of a certain period of time after a first detection of the first control signal 155a output by the first control device 155a on the line 160a. For example, this determination method can be based on the fact that the first control signal 155a is only applied for a predetermined signal duration for the (first) line 160a, so that the second control device 155b can assume that after this predetermined signal duration the (first) line 160a is "free" again. In this case, the second control device 155b could then apply the second control signal 157b to the line 160a. Alternatively, the time can also be determined by, for example, the first signal 157a being evaluated in such a way that a final sequence in the first signal 157a is detected, which signals that the first signal 157a will shortly end and thus the line 160a will be free again for the output of the second control signal 157b.

Figure 2:
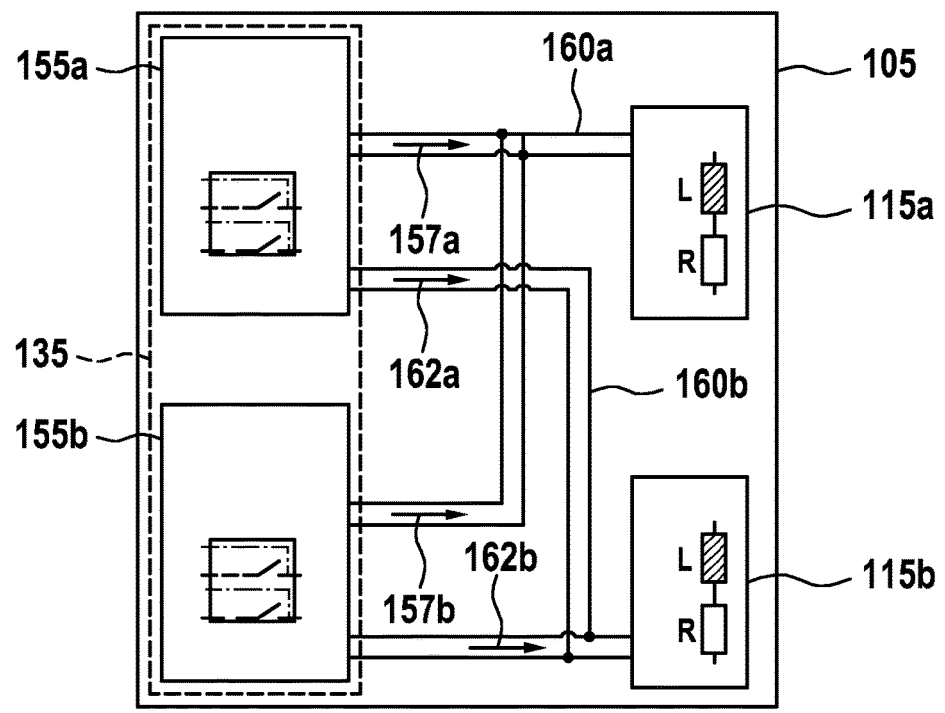
FIG. 2 shows a more detailed block diagram of a section of the actuator system from FIG. 1.

FIG. 2 shows a block diagram of the actuator system 110 from FIG. 1, wherein the control unit 135 with the first control device 155a and the second control device 155b is shown here. The first control device 155a is connected for the transmission of the first control signal 157a by the line 160a to the (first) actuator 115a, which is in the form of a pressure control valve in the present case. Furthermore, the first control device 155a is connected for the transmission of the third control signal 162a to the second actuator 115b by the second line 160b, wherein the second actuator 115b is also again in the form of a pressure control valve. The second control device 155b is connected to the (first) actuator 115a by line 160a for the transmission of the second control signal 157b. Furthermore, the second control device 155b is connected for the transmission of the fourth control signal 162b to the second actuator 115b by the second line 160b. The actuators 115a or 115b respectively. include, for example, a resistance and/or an inductance to generate a magnetic field in response to control by one of the control signals 157 or 162, by which a mechanical component such as a locking latch can be moved to open a compressed air passage. The control device 155a and/or 155b comprises a high-side switch (HS) which can be opened or closed by a control command of a microcontroller to transmit a sufficiently high power to the actuator to be able to initiate the corresponding mechanical movement. Alternatively or additionally, the control device 155a and/or 155b may have a low-side switch (LS), which can also be opened or closed by a control command of a microcontroller.

In FIG. 2, the operating principle of the control of a pressure control valve, as an example of an actuator, with two electronic control devices 155a and 155b, also synonymously referred to below as ECU1 and ECU2, is shown schematically. Here it is essentially shown that an actuator is connected to two control devices 155a or 155b (i.e. the ECUs 1 and 2) and thus can be controlled by both ECUs 155a and 155b. The ECUs or control devices 155a or 155b each have corresponding high-side switches HS as well as low-side switches LS and feedback lines to the microcontroller. The control of the respective actuator 115 can vary in the number and configuration of the high-side and low-side switches and is shown for illustration purposes only.

When using an actuator such as the actuator 115 by two or more control devices 155 (ECUs), simultaneous control by both control devices 155a and 155b should be avoided. The simultaneous control of an actuator 115 is very unfavorable due to its own dynamic behavior and the system dynamic behavior. There could be uncontrollable regulation/control behavior, since due to its control the first control device 155a hinders the regulation/control of the second control device 155b.

Furthermore, feedback from one ECU to the other ECU should also be excluded. In addition, the second ECU 155b conveniently represents a so-called fallback level (backup), which is only intended to switch to active operation in the event of a fault of the first control device 155a. Nevertheless, it should be ensured that the second ECU 155b can ensure error-free operation in the case of backup. For this purpose, both control devices 155a and 155b should conveniently at regular intervals subject the respective actuator 115a or 115b to test signals as control signals and evaluate the result independently. The difficulty now lies in the evaluation of the own test signals of the ECU1 155a and the influence by test signals of the ECU2 155b because test pulses performed by ECU1 155a affect the test pulses and the feedback of ECU2 155b and vice versa. It therefore stands to reason to synchronize the two ECUs 155a and 155b. Since the ECUs 155a and 155b are connected to each other as a rule via a data transmission bus, for example CAN, LIN, MOST, Ethernet and many more, synchronization could be realized with this. In most cases, however, the vehicle manufacturer wants to avoid busy data traffic. Furthermore, in addition to the pure data transfer, there is a basic delay due to the protocol used.

The approach presented here includes the communication and synchronization of the two ECUs 155a and 155b by their emitted test pulses and/or controls, i.e. control signals, which can also be used as test signals or test pulses, since this also controls the actuator in question as a test. For example, the ECU1 155a sends out a test pulse or a first control signal 157a for fault diagnosis. This is read simultaneously by ECU1 155a and ECU2 155b. While the ECU1 155a verifies its test pulse accordingly, the ECU2 155b uses this test pulse of the first control signal 157a as an interrupt source or a request to start its own test pulse as a second control signal 157b with a certain dead time. A so-called handshake signal is now created, with which it is ensured that the ECU1 155a knows of the planned test pulse as the second control signal 157b of the ECU2 155b and can process this information.

The test pulses or control signals 157a or 157b can vary in the corresponding frequencies and can thus reproduce a protocol with which both ECUs 155a and 155b can communicate with each other.

As part of functional safety, which also requires multi-stage communication lines or bus systems, in this way a redundant BUS can be realized by the test pulses or control signals 157a or 157b of the ECUs 155a or 155b. This leads to a considerable cost saving.

Since multiple control of the actuator should also be avoided (see the above description), the respective passive ECU can detect the control of the active ECU by its own feedback, interpret it as a sign of life and react accordingly with a suitable operating state.

The approach presented here can also be extended. For example, with this approach, a system with two ECUs corresponding to the control devices 155 and three dual-used actuators corresponding to the actuators 115a and 115b can be set up, wherein additional communications can take place via a CAN bus connection. Test pulses can thus also be implemented accordingly for synchronizing the transmission for all three actuators. A special test pulse sequence from the active ECU1 155a (master) can also be defined to request the passive ECU2 155b (slave) to undertake regulation for a defined time. During this time, the ECU2 155b is the master and, in the event of a regulation request, would undertake active regulation of the actuators 115. After the time interval or duration, undertaking regulation is transferred back to ECU1 155a. Using CAN messages (or messages on an alternative bus on a Flexray or Ethernet bus), the redistribution of the master and slave ECU is monitored redundantly and without increased bus utilization. A system with four ECUs and two dual-use actuators can also be implemented. In principle, the number of actuators for multiple use is variable. The number of ECUs 155, which communicate with each other via one or more actuators 115, is also variable. Actuators and loads with any impedance are suitable.

Figure 3:
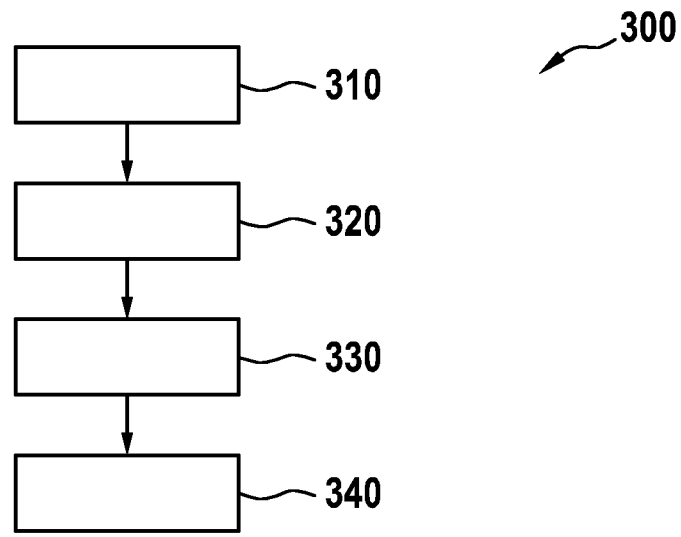
FIG. 3 shows a flowchart of an exemplary embodiment of a method for controlling at least one actuator of an actuator system.

FIG. 3 shows a flow diagram of an exemplary embodiment of a method 300 for controlling at least one actuator of an actuator system, wherein the actuator system has at least a first and a second control device, wherein the first control device is configured to control an actuator via a line and wherein the second control device is configured to control the actuator via the line. The method 300 includes a step 310 of outputting a first control signal from the first control unit via the line to the actuator. Furthermore, the method 300 includes a step 320 of detecting the first control signal on the line by the second control device and suppressing an output of a second control signal to the actuator by the second control device during the time in which the first control device is outputting the first control signal to the line. Furthermore, the method 300 includes a step 330 of the determination of a time by the second control device at which no first control signal is present on the line. Finally, the method 300 includes a step 340 of subjecting the actuator to a second control signal via the line by the second control device if there is no first control signal on the line.

Figure 4:
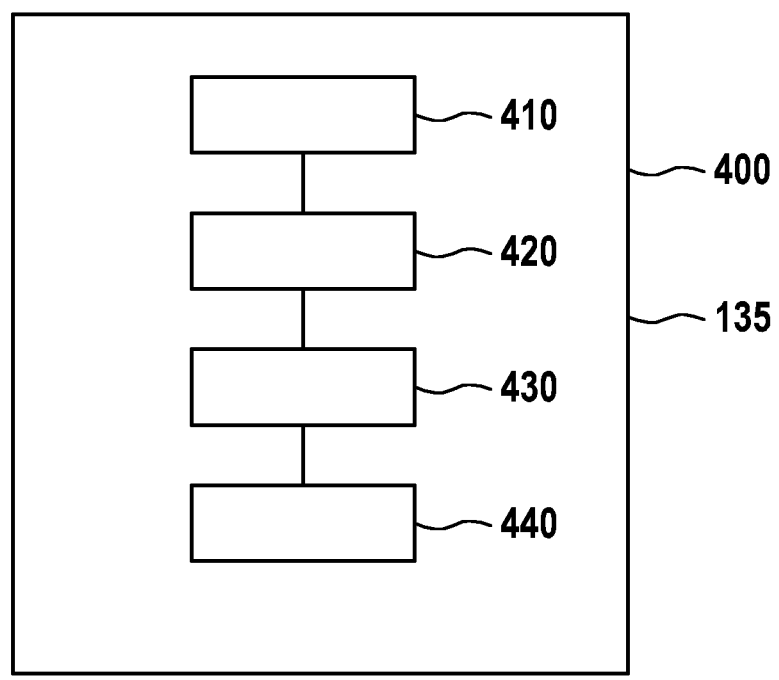
FIG. 4 shows a block diagram of an exemplary embodiment of a device for controlling at least one actuator of an actuator system.

FIG. 4 shows a block diagram of an exemplary embodiment of a device 400 for controlling at least one actuator of an actuator system, wherein the actuator system has at least a first and a second control device, wherein the first control device is configured to control at least one actuator via a line and wherein the second control device is configured to control the actuator via the line. The device 400 comprises a unit 410 for outputting a first control signal from the first control unit via the line to the actuator. Further, the device 400 comprises a unit 420 for detecting the first control signal on the line by the second control device and suppressing an output of a second control signal to the actuator by the second control device during the time in which the first control device is outputting the first control signal on the line. Also, the device 400 comprises a unit 430 for determining a time by the second control device at which there is no first control signal on the line. Finally, the device 400 comprises a unit 440 for subjecting the actuator to a second control signal via the line by the second control device if there is no first control signal on the line.

If an exemplary embodiment comprises an "and/or" link between a first feature and a second feature, this is to be read as follows; that the exemplary embodiment according to one embodiment has both the first feature and the second feature and according to a further embodiment has either only the first feature or only the second feature.

THE REFERENCE CHARACTER LIST IS AS FOLLOWS

100 Vehicle
105 Actuator system
110 Brake system
115a (First) actuator
115b Second actuator
120 Storage tank
125a First brake unit
125b Second brake unit
130a First wheel
130b Second wheel
132 Compressor
135 Control unit
140 Brake request signal
145 Brake pedal
150 Brake control unit
155a First control device
155b Second control device
157a First control signal
157b Second control signal
160a (First) line
160b Second line
162a Third control signal
162b Fourth control signal
L Inductance
R Resistance
300 Method for controlling at least one actuator of an actuator system
310 Output step
320 Detection step
330 Determination step
340 Application step
400 Device for controlling at least one actuator of an actuator system
410 Output unit
420 Detection unit
430 Determination unit
440 Application unit

The invention claimed is:

1. A method for controlling at least one actuator of an actuator system, the method comprising:
outputting a first control signal from a first control device via a line to an actuator, wherein the actuator system has at least the first control device and a second control device, wherein the first control device is configured to control at least the actuator via the line and wherein the second control device is configured to control the actuator via the line;
detecting the first control signal on the line by the second control device and suppressing the output of a second control signal to the actuator by the second control device during a time in which the first control device is outputting the first control signal to the line;
determining a time by the second control device at which no first control signal is present on the line; and
applying to the actuator a second control signal via the line by the second control device if no first control signal is present on the line.

2. The method of claim 1, wherein in the determining, the time is determined as a predetermined period of time after the reception of the first control signal in the second control device and/or wherein in the determining, the time is determined by the reception of a predetermined sequence in the first control signal.

3. The method of claim 1, further comprising:
evaluating a response signal obtained to the first and/or second control signal of the actuator, wherein the evaluating is performed in the first control device and/or the second control device to check a functionality of the actuator and/or of the first control device and/or the second control device, wherein in the evaluating a functionality of a high-side switch (HS) and/or of a low-side switch (LS) is monitored in the first control device and/or the second control device or in the actuator.

4. The method of claim 1, wherein in the applying, the actuator is supplied with the second control signal, which differs from the first control signal.

5. The method of claim 1, further comprising:
controlling the actuator in a normal operating mode by the first control device and in a fault operating mode, in which a fault in the operation of the first control device or in a connection of the first control device to the actuator has been detected, the actuator is controlled by the second control device.

6. The method of claim 1, wherein in the outputting, the first control signal is transmitted via a bus line to the actuator and/or in the applying the second control signal is transmitted via the bus line to the actuator, wherein the bus line is formed by a CAN bus line, a LIN bus line, a MOST bus line or an Ethernet bus line, and/or wherein in the outputting the first control signal is transmitted to the actuator via a line reserved exclusively for the first or second control signal and/or in the applying the second control signal is transmitted to the actuator via the line reserved exclusively for the first or second control signal.

7. The method of claim 1, wherein the tasks of the method are carried out repeatedly, wherein in a repeatedly performed output task a check is carried out as to whether the second control signal is present on the line to the actuator, and wherein in the case in which the second control signal is present on the line the first control signal is not output, and/or wherein if the second control signal is not present the first control signal is output to the actuator.

8. The method of claim 1, wherein in the outputting, the first control signal is output to a pressure valve of the vehicle as an actuator and/or in the applying the second control signal is applied to a pressure valve of the vehicle as an actuator.

9. The method of claim 1, wherein the actuator system has at least a second actuator, which is connected via a second line to the first and the second control devices, wherein in the outputting a third control signal is output from the first control device to the second actuator via the second line, wherein in the detecting the third control signal is detected on the second line by the second control device and the output of a fourth control signal to the second actuator is suppressed by the second control device during the time in which the first control device is outputting the third control signal to the second line, and wherein in the determining a second time is determined by the second control device at which there is no third control signal present on the second line and wherein in the applying the second actuator is supplied with the fourth control signal via the second line by the second control device if no third control signal is present on the second line.

10. An apparatus for controlling at least one actuator of an actuator system, comprising:
a device configured to perform the following:
outputting a first control signal from a first control device via a line to an actuator, wherein the actuator system has at least the first control device and a second control device, wherein the first control device is configured to control at least the actuator via the line and wherein the second control device is configured to control the actuator via the line;
detecting the first control signal on the line by the second control device and suppressing the output of a second control signal to the actuator by the second control device during a time in which the first control device is outputting the first control signal to the line;
determining a time by the second control device at which no first control signal is present on the line; and
applying to the actuator a second control signal via the line by the second control device if no first control signal is present on the line.

11. A non-transitory computer readable medium having a computer program, which is executable by a processor, comprising:
a program code arrangement having program code for controlling at least one actuator of an actuator system, by performing the following:
outputting a first control signal from a first control device via a line to an actuator, wherein the actuator system has at least the first control device and a second control device, wherein the first control device is configured to control at least the actuator via the line and wherein the second control device is configured to control the actuator via the line;
detecting the first control signal on the line by the second control device and suppressing the output of a second control signal to the actuator by the second control device during a time in which the first control device is outputting the first control signal to the line;
determining a time by the second control device at which no first control signal is present on the line; and
applying to the actuator a second control signal via the line by the second control device if no first control signal is present on the line.

12. The computer readable medium of claim 11, wherein in the determining, the time is determined as a predetermined period of time after the reception of the first control signal in the second control device and/or wherein in the determining, the time is determined by the reception of a predetermined sequence in the first control signal.

* * * * *